(12) United States Patent
Maistros, Jr.

(10) Patent No.: US 10,974,779 B2
(45) Date of Patent: Apr. 13, 2021

(54) ROTATABLE VEHICLE FRAME JIG

(71) Applicant: Honda Motor Co., Ltd., Tokyo (JP)

(72) Inventor: Paul M. Maistros, Jr., Florence, SC (US)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 16/260,748

(22) Filed: Jan. 29, 2019

(65) Prior Publication Data

US 2020/0239092 A1 Jul. 30, 2020

(51) Int. Cl.
- *B62D 65/02* (2006.01)
- *B21D 53/88* (2006.01)
- *B62D 21/02* (2006.01)

(52) U.S. Cl.
CPC .......... *B62D 65/026* (2013.01); *B21D 53/88* (2013.01); *B62D 21/02* (2013.01)

(58) Field of Classification Search
CPC .... B62D 65/026; B62D 21/02; B62D 65/022; B21D 53/88; B25H 5/00
See application file for complete search history.

(56) References Cited

FOREIGN PATENT DOCUMENTS

| | | |
|---|---|---|
| CN | 104070314 A | 10/2014 |
| CN | 103057623 B | 2/2015 |
| CN | 106426032 A | 2/2017 |
| CN | 106238980 B | 9/2017 |
| CN | 107598453 A | 1/2018 |
| CN | 206869345 U | 1/2018 |
| CN | 107775207 A | 3/2018 |
| CN | 107953045 A | 4/2018 |
| CN | 108115347 A | 6/2018 |
| CN | 108247260 A | 7/2018 |
| JP | 3979254 B2 | 9/2007 |
| WO | 2018091450 A1 | 5/2018 |

*Primary Examiner* — John C Hong
(74) *Attorney, Agent, or Firm* — Armstrong Teasdale LLP

(57) ABSTRACT

Devices, systems, and methods for positioning a vehicle frame in a plurality of rotational positions about an axis of rotation and performing at least two assembly tasks are provided. An assembly and a system that includes forward and rear toolings that engage and retain forward and rear portions of the vehicle frame, and that cooperatively rotate the vehicle frame about an axis of rotation are provided.

20 Claims, 6 Drawing Sheets

ROTATABLE VEHICLE FRAME JIG

BACKGROUND

The field of the present disclosure relates generally to vehicle assembly equipment and, more specifically, to a positioning jig system for use in positioning a vehicle body frame in a series of rotational positions.

The production of motor vehicles commonly includes transferring a vehicle body frame between different assembly stations using a transfer cart and positioning the vehicle body frame at each of the different assembly stations to initiate a production step, such as welding. The vehicle body frame is typically positioned within an assembly station by coupling the vehicle frame to a jig. For example, a vehicle body frame may be positioned within a welding station of a production facility by coupling the vehicle frame within a jig that positions the vehicle body frame at a predetermined spatial relationship with respect to one or more welding robots. Each jig is typically designed to position a single model of vehicle body frame at a single position within the assembly station. Consequently, reconfiguring an assembly station to position a different model of vehicle body frame, or even the same model of vehicle body frame in a different position, involves replacing one jig with different jig, resulting in lost productivity and increased wear on jigs and associated jig attachment fittings.

BRIEF DESCRIPTION

In one aspect, an assembly for positioning a vehicle frame in a plurality of rotational positions about an axis of rotation is provided. The assembly includes a forward tooling assembly and a rear tooling assembly to engage and retain the vehicle frame. The forward and rear tooling assemblies cooperatively rotate to position the vehicle frame in the plurality of rotational positions.

In another aspect, a system for positioning a vehicle frame in a plurality of rotational positions about an axis of rotation is provided. The system includes a tooling assembly that includes a forward tooling assembly and a rear tooling assembly that engages and retains the vehicle frame. The system also includes a forward support extending downward from a fixed forward support end to a free forward support end, a forward flange bearing coupled to the free forward support end, and a forward support axle retained within the forward flange bearing. The system additionally includes a rear support extending downward from a fixed rear support end to a free rear support end, a rear flange bearing coupled to the free rear support end, and a rear support axle retained within the rear flange bearing. The forward and rear tooling assemblies are coupled to the forward and rear support axles, respectively, and cooperatively rotate to position the vehicle frame in the plurality of rotational positions.

In an additional aspect, a method for performing at least two assembly tasks on a vehicle frame positioned within a work station is provided. The method includes providing an assembly that includes a forward tooling and a rear tooling that engages and retains the vehicle frame. The forward and rear toolings cooperatively rotate to position the vehicle frame in a plurality of rotational positions about an axis of rotation. The method also includes locking the vehicle frame to the forward and rear toolings, rotating the vehicle frame about the axis of rotation to a first rotational position within the work station, and performing a first assembly task to the vehicle frame. The method also includes rotating the vehicle frame about the axis of rotation to an additional rotational position within the work station and performing an additional assembly task to the vehicle frame.

DETAILED DESCRIPTION

The embodiments described herein relate generally to a system for use in assembling a vehicle. More specifically, the vehicle assembly system described herein includes forward and rear tooling assemblies mounted to rotatable forward and rear support axles that are retained within flange bearings mounted to downward-projecting forward and rear supports coupled to an overhead support frame, and positioned over a work station of an assembly line. The forward and rear tooling assemblies couple to forward and rear portions of a vehicle frame to rotate the coupled vehicle frame about an axis of rotation to at least two different rotational positions associated with multiple assembly tasks performed at different frame locations. Once coupled to the forward and rear tooling assemblies, the vehicle assembly system repositions the vehicle frame for multiple assembly tasks without a need for uncoupling the vehicle frame and/or changing out tooling assemblies to reposition and thereby facilitates reducing the time and mechanical wear associated with the multiple assembly tasks.

The embodiments described herein are exemplary and are not limited to the descriptions provided. For example, although described in conjunction with a vehicle frame, the invention described herein is not limited for use with vehicle frames, and may be instead used with other vehicle components such as, but not limited to, vehicle bodies, vehicle engines, vehicle transmissions, and the like. In addition, although portions of the description are described in conjunction with a vehicle component, the invention described herein is not limited for use in conjunction with a vehicle, and rather, may instead be used with any product of manufacturing making use of a production line with at least one work station that includes multiple assembly tasks performed respectively at multiple rotational positions as described herein.

Figure 1:
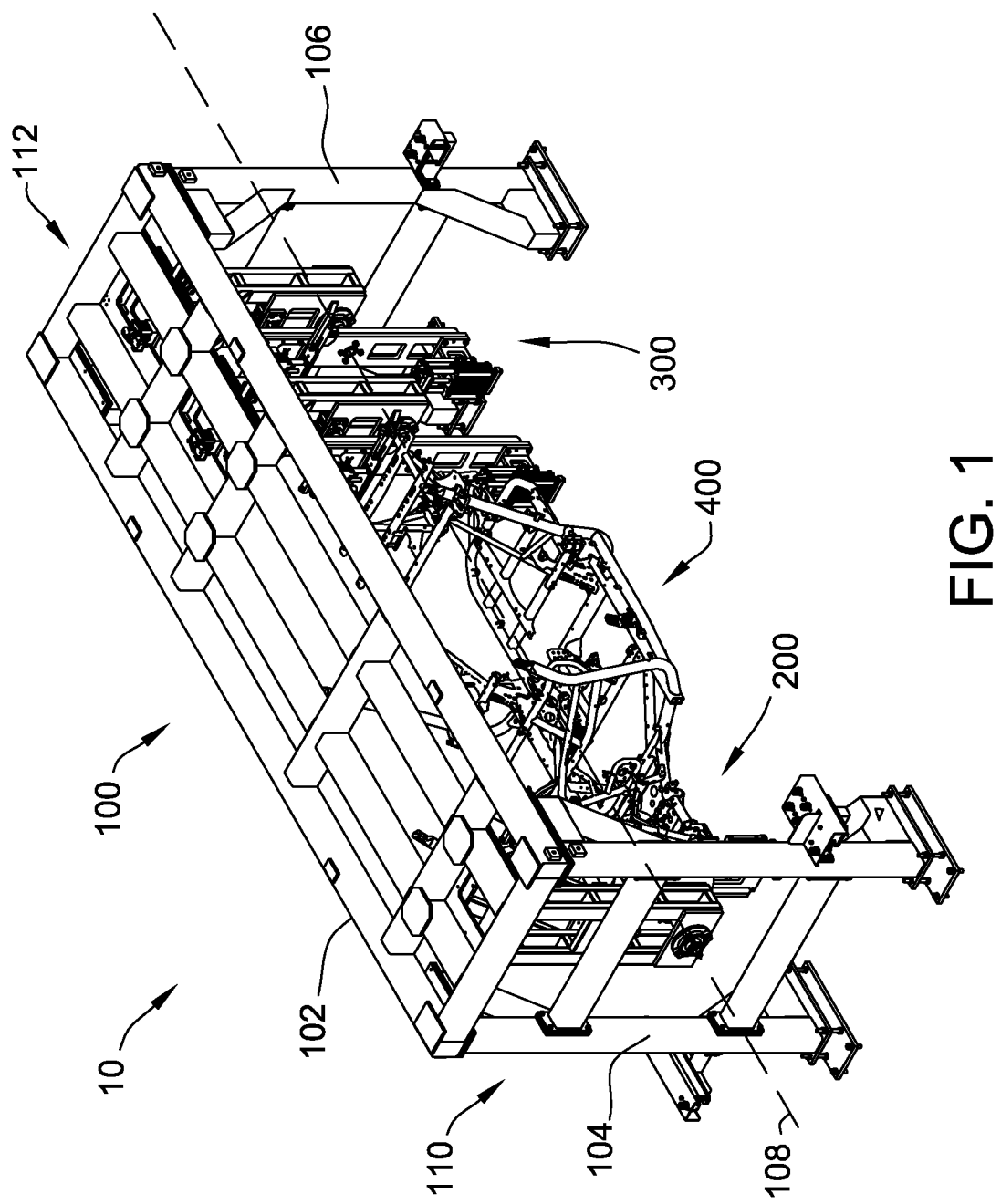
FIG. 1 is a perspective view of an exemplary vehicle assembly system.

FIG. 1 is a perspective view of an exemplary vehicle assembly system 10 that includes a hanging-style frame 100, a forward tooling assembly 200 coupled to frame 100 near a forward portion 110 and a rear tooling assembly 300 coupled to frame 100 near a rear portion 112. Frame 100 includes a support frame 102 positioned above a portion of a vehicle assembly line (not shown) including, but not limited to, a work station such as a robotic welding station. Support frame 102 is coupled at opposite ends to a forward support column 104 and to a rear support column 106. Forward support column 104 and rear support column 106 maintain support frame 102 at a height sufficient for mounting of a vehicle frame 400 to forward tooling assembly 200 and to rear tooling assembly 300, and for rotating mounted vehicle frame 400 about axis of rotation 108.

Figure 2:
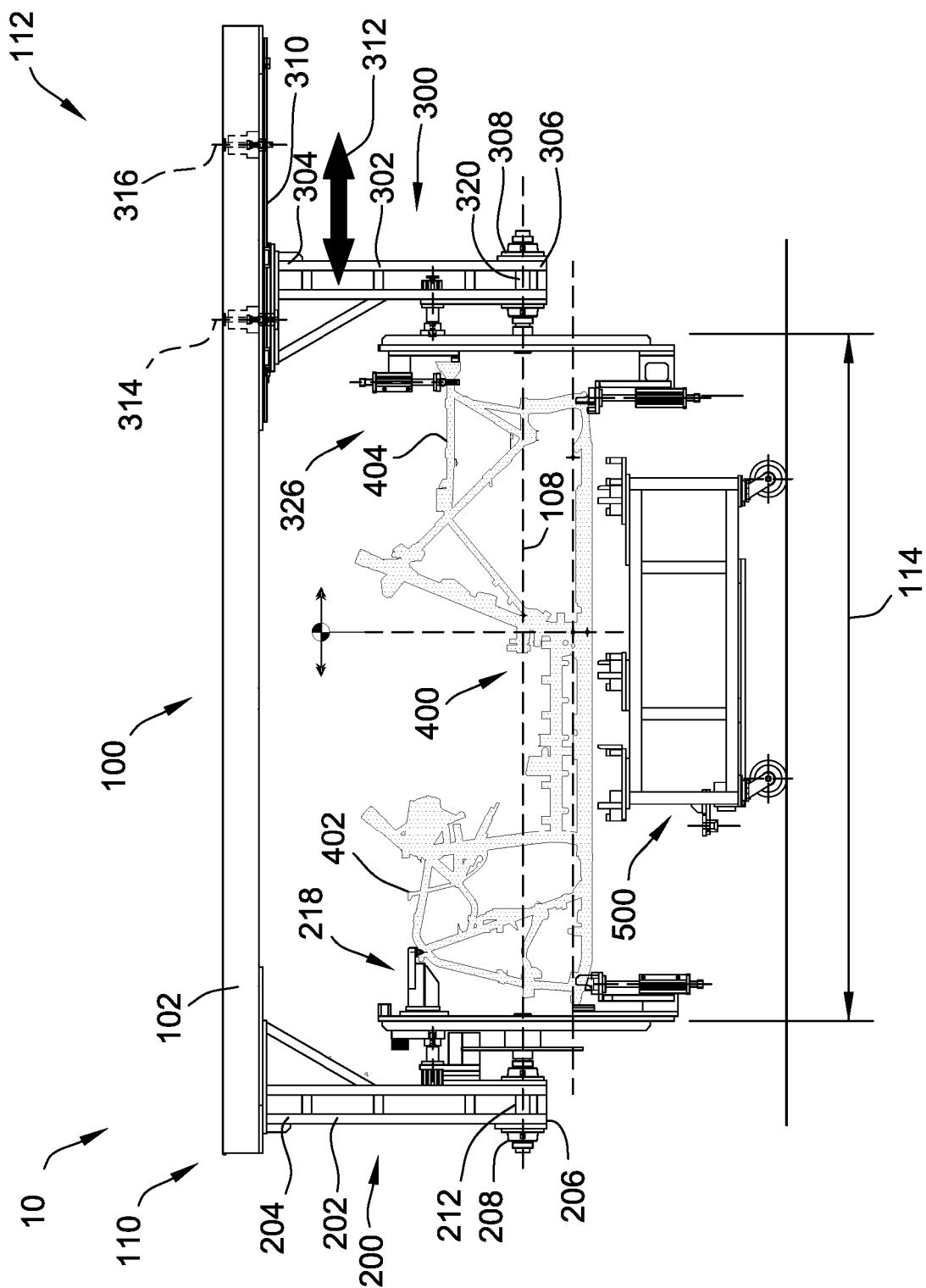
FIG. 2 is a side view of the vehicle assembly system shown in FIG. 1.

FIG. 2 is a side view of vehicle assembly system 10 shown in FIG. 1 with forward and rear support columns 104 and 106 removed to facilitate viewing of forward tooling assembly 200 and rear tooling assembly 300. In the exemplary embodiment, forward tooling assembly 200 includes a forward support 202 coupled to forward portion 110 of support frame 102 at a forward fixed end 204. Moreover, in the exemplary embodiment, forward support 202 projects downward in a generally vertical direction from forward fixed end 204 at support frame 102 to a free end 206 that is opposite forward fixed end 204. A forward flange bearing 208 is coupled at free end 206 of forward support 202 in alignment with axis of rotation 108.

Rear tooling assembly 300 includes a rear support 302 coupled to rear portion 112 of support frame 102 at a rear fixed end 304. In the exemplary embodiment, rear support 302 projects downward in a generally vertical direction from rear fixed end 304 coupled to support frame 102 to a free end 306 that is opposite rear fixed end 304. A rear flange bearing 308 is coupled at free end 306 of rear support 302 in alignment with axis of rotation 108.

In the exemplary embodiment, forward tooling 218 is coupled to a forward support axle 212 that is retained within forward flange bearing 208, and rear tooling 326 is coupled to a rear support axle 320 that is retained within rear flange bearing 308. Forward support axle 212 and rear support axle 320 are mutually aligned with axis of rotation 108 and rotate freely within forward flange bearing 208 and rear flange bearing 308 about axis of rotation 108. Forward support axle 212 and rear support axle 320 cooperatively enable rotation of frame 400 about axis of rotation 108 when mounted to forward tooling 218 and rear tooling 326, as described in additional detail below.

In various embodiments, vehicle assembly system 10 includes various means of adjusting system elements 202, 218, 302, 326 to accommodate mounting and dismounting frame 400, to accommodate different models of frame 400, and to transfer frame 400 to, and from, a vehicle frame transfer cart 500 used to transport frame 400 between various work stations of production line. In various embodiments, vehicle assembly system 10 includes one or more means of adjusting a tooling separation distance 114. By way of non-limiting example, tooling separation distance 114 may be increased to provide sufficient room for a frame 400 and frame transfer cart 500 to be positioned between forward and rear toolings 218 and 326, respectively, prior to mounting, and tooling separation distance 114 may be decreased to position respective forward and rear toolings 218 and 326 for mounting frame 400 as described in additional detail below. By way of an additional non-limiting example, tooling separation distance, separation distance of frame support elements 220 and 222 within forward tooling assembly 200, and/or separation distance of frame support elements 328 and 330 within rear tooling assembly 300 are adjusted to accommodate different vehicle frame dimensions as described in additional detail below.

Figure 3:
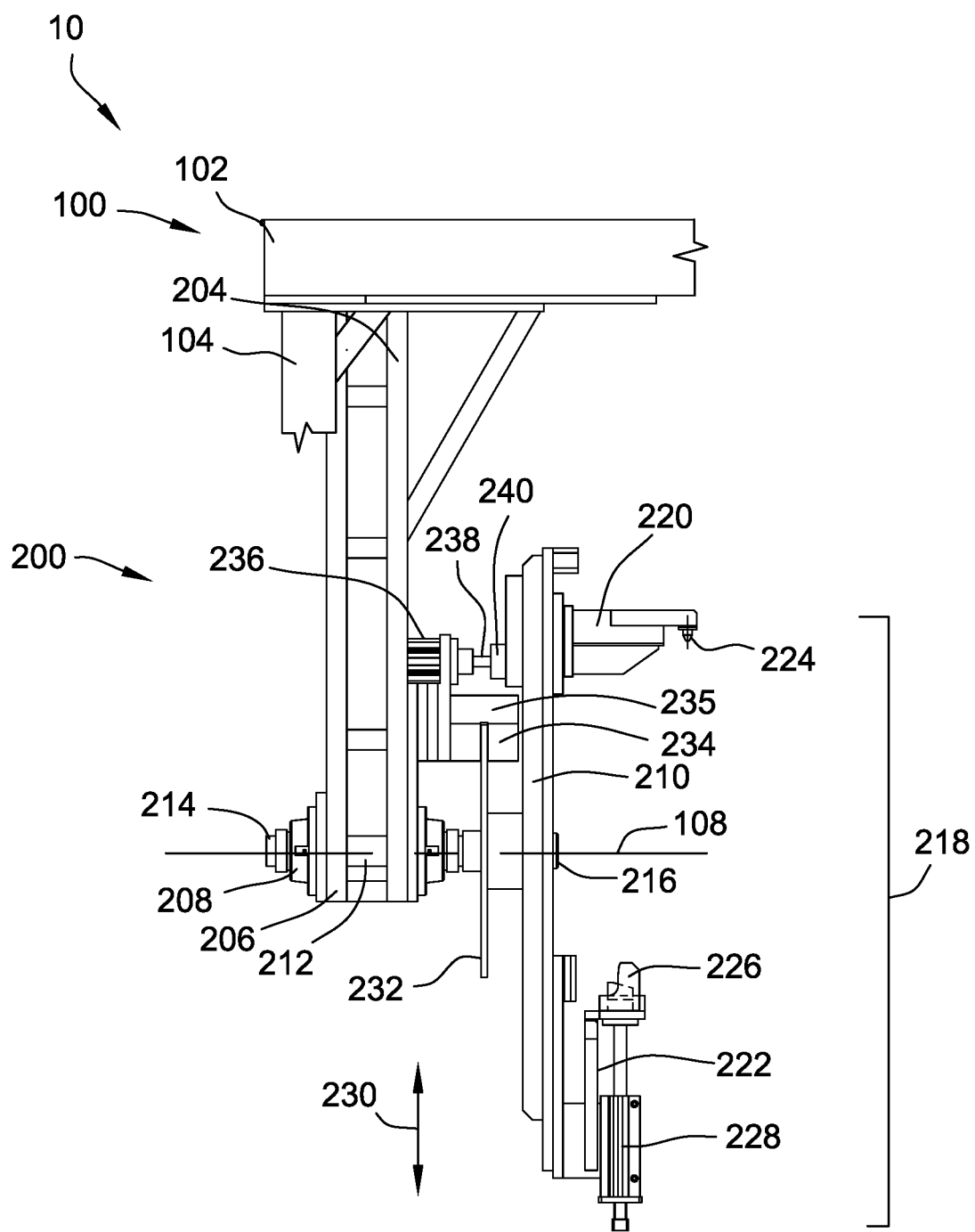
FIG. 3 is a partial cutaway side view of a forward tooling assembly of the vehicle assembly system shown in FIG. 1 and FIG. 2.

FIG. 3 is a detailed side view of forward tooling assembly 200 illustrated in FIG. 2. Forward support axle 212 is retained within forward flange bearing 208 at a first axle end 214 such that forward support axle 212 freely rotates about axis of rotation 108. A forward arm 210 is coupled to forward support axle 212 at a second axle end 216 opposite first axle end 214. Forward tooling 218 is coupled to forward arm 210.

Forward tooling 218 reversibly couples to a forward portion 402 (illustrated in FIG. 2) of vehicle frame 400 when mounted to forward tooling assembly 200. Forward tooling 218 includes an upper frame support 220 and a lower frame support 222 positioned at opposite ends of forward arm 210. Upper frame support 220 and lower frame support 222 are provided with an upper frame retention fitting 224 and a lower frame retention fitting 226, respectively. Upper and lower frame retention fittings 224 and 226 cooperatively engage and retain forward frame portion 402 mechanically, as illustrated in FIG. 1 and FIG. 2. Referring again to FIG. 3, lower frame support 222 is further provided with a linear actuator 228 that translates lower frame support 222 in a generally vertical direction 230 to transfer frame 400 to and from frame transfer cart 500, as well as to mechanically engage forward frame portion 402 to upper and lower frame retention fittings 224 and 226.

Linear actuator 228 extends to translate lower frame retention fitting 226 upward and retracts to translate lower frame retention fitting 226 downward. When fully retracted, lower frame retention fitting 226 is below forward portion 402 of vehicle frame 400. Linear actuator 228 partially extends to mechanically engage forward portion 402 of vehicle frame 400. Linear actuator 228 further extends to translate lower frame retention fitting 226 and previously mounted forward portion 402 of vehicle frame 400 upward to engage forward portion 402 of vehicle frame 400 with upper frame retention fitting 224 until forward portion 402 of vehicle frame 400 is cooperatively retained between upper frame retention fitting 224 and lower frame retention fitting 226.

In various other embodiments, forward tooling assembly 200 is further provided with any additional means of vertically translating at least a portion of forward tooling assembly 200 (not shown) without limitation. Non-limiting additional means of repositioning at least a portion of forward tooling assembly 200 include: an upper frame support actuator operatively coupled between upper frame support 220 and forward arm 210 that translates upper frame support 220 in vertical direction 230, and/or a support arm actuator operatively coupled between forward arm 210 and second axle end 216 that translates forward arm 210 in vertical direction 230 during lifting and lowering of frame 400 relative to frame transfer cart 500.

Forward arm 210 and forward tooling 218 freely rotate about axis of rotation 108 in cooperation with rear tooling 326 when frame 400 is mounted to vehicle assembly system 10. This rotation enables repositioning frame 400 within work station to facilitate performing multiple vehicle assembly steps involving different regions of frame 400 and/or using multiple tools or devices positioned at different locations within work station. In various embodiments, forward tooling assembly 200 and/or rear tooling assembly 300 are further provided with means to stop and/or lock rotation of frame 400 about axis of rotation 108 when mounted to vehicle assembly system 10.

Referring again to FIG. 3, the exemplary embodiment of forward tooling assembly 200 also includes a brake assembly that includes a brake disc 232 and a pair of brake pads 234. Brake disc 232 is centered on forward support axle 212 and is coupled to forward arm 210 such that brake disc 232 rotates synchronously with forward arm 210 and forward support axle 212. An outer edge of brake disc 232 positioned between a pair of brake pads 234 and brake actuator 235 is coupled to forward support 202. Brake disc 232 transfers a braking force generated by brake pads 234 to arrest rotation of frame 400, forward tooling 218 and rear tooling 326 during use. In various other embodiments, any other brake design mounted to any other suitable position of forward tooling assembly 200 may provide braking force without limitation including, but not limited to, drum brakes. In various additional embodiments, rear tooling assembly 300 further includes a brake system in addition to, or in lieu of, brake system of forward tooling assembly 200 as described above.

In various embodiments, forward tooling assembly 200 also includes a locking means to lock position of forward arm 210 in at least one rotational position including, but not limited to, a generally vertical orientation (see FIG. 3), a generally horizontal orientation, and any other suitable rotational orientation. In one embodiment, locking means locks forward arm 210 in a generally vertical orientation to facilitate mounting and unmounting of frame 400. In other additional embodiments, locking means locks forward arm 210 at one or more additional orientations to position frame 400 for one or more production steps implemented within work station associated with vehicle assembly system 10.

Referring again to FIG. 3, forward tooling assembly 200 also includes a forward rotation locking pin actuator 236 coupled to forward support 202, and a forward rotation locking pin 238 operatively coupled to forward rotation locking pin actuator 236. Forward rotation locking pin actuator 236 advances and retracts forward rotation locking pin 238 in and out of a forward rotation locking pin receptacle 240 affixed to forward arm 210. When forward rotation locking pin 238 is advanced into forward rotation locking pin receptacle 240, forward arm 210 is locked into an orientation including, but not limited to, a generally vertical orientation as illustrated in FIG. 3. In various other embodiments, forward tooling assembly 200 includes multiple forward rotation locking pin receptacles 240 and/or multiple forward rotation locking pins 238 to lock forward arm 210 into multiple orientations.

Figure 4:
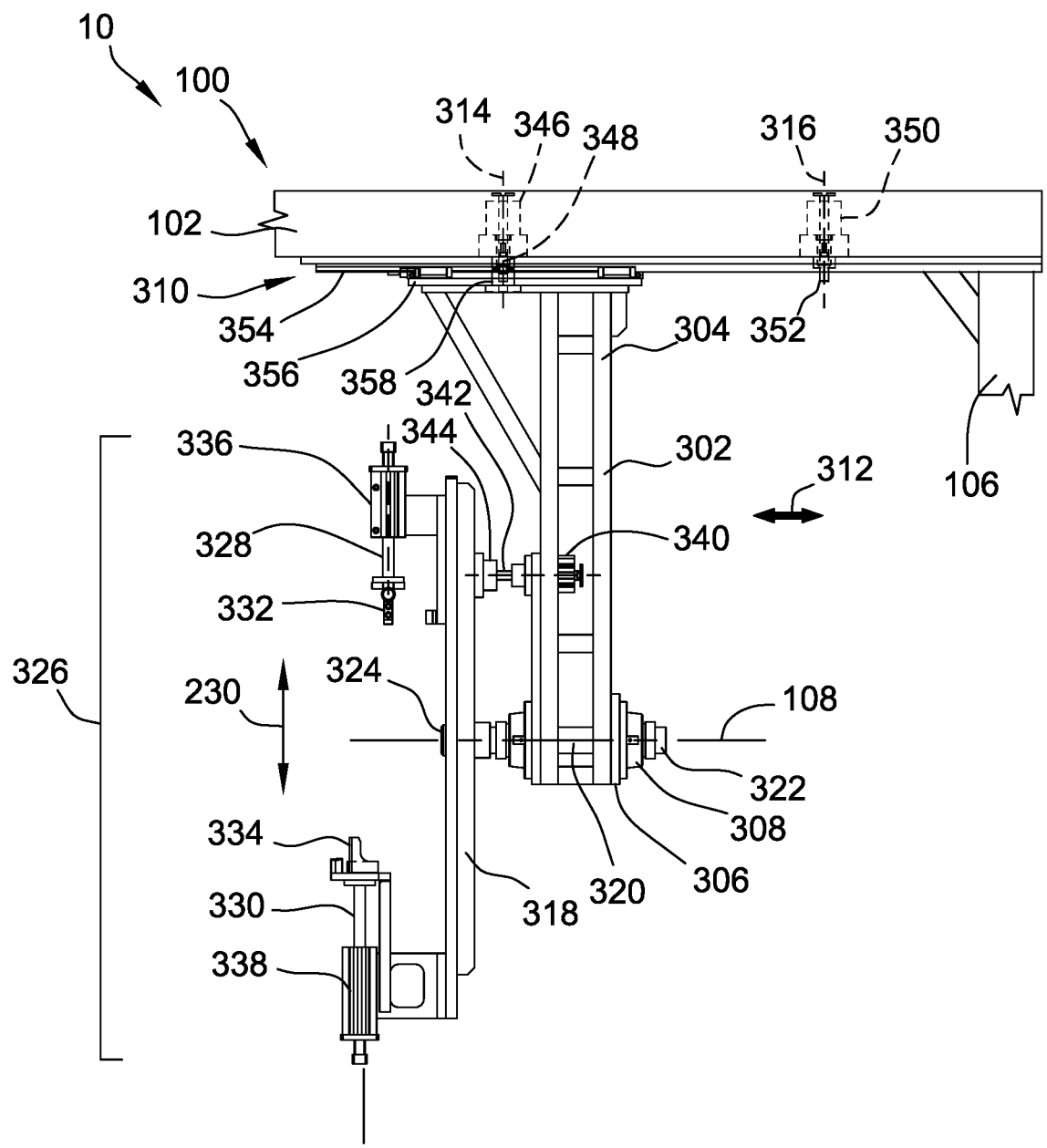
FIG. 4 is a partial cutaway side view of a rear tooling assembly of the vehicle assembly system shown in FIG. 1 and FIG. 2.

FIG. 4 is a detailed side view of rear tooling assembly 300 illustrated in FIG. 2. In the exemplary embodiment, rear support axle 320 is retained within rear flange bearing 308 at a first axle end 322 such that rear support axle 320 freely rotates about axis of rotation 108. A rear arm 318 is coupled to rear support axle 320 at a second axle end 324 opposite first axle end 322. Rear tooling 326 is coupled to rear arm 318.

Rear tooling 326 reversibly couples to a rear portion 404 (illustrated in FIG. 2) of vehicle frame 400 when mounted to rear tooling assembly 300. Rear tooling 326 includes an upper frame support 328 and a lower frame support 330 positioned at opposite ends of rear arm 318. Upper frame support 328 and lower frame support 330 are provided with an upper frame retention fitting 332 and a lower frame retention fitting 334, respectively. Upper and lower frame retention fittings 332 and 334 cooperatively engage and retain rear frame portion 404 mechanically, as illustrated in FIG. 1 and FIG. 2. Referring again to FIG. 4, lower frame support 330 is also provided with a linear actuator 338 that translates lower frame support 330 in a vertical direction 230 to transfer frame 400 to and from frame transfer cart 500 (see FIG. 2), as well as to mechanically engage rear frame portion 404 to upper and lower frame retention fittings 328 and 330. Upper frame support 328 includes a second linear actuator 336 operatively coupled between upper frame support 328 and rear arm 318 that translates upper frame support 328 in vertical direction 230.

Linear actuator 338 extends to translate lower frame retention fitting 334 upward and retracts to translate lower frame retention fitting 334 downward. When fully retracted, lower frame retention fitting 334 is below rear portion 404 of vehicle frame 400. Linear actuator 338 partially extends to mechanically engage rear portion 404 of vehicle frame 400. Linear actuator 338 also extends to translate lower frame retention fitting 334 and mounted rear portion 404 of vehicle frame 400 upward to engage rear portion 404 of vehicle frame 400 with upper frame retention fitting 332, until rear portion 404 of vehicle frame 400 is cooperatively retained between upper frame retention fitting 332 and lower frame retention fitting 334. In the exemplary embodiment, cooperative mechanical engagement of rear portion 404 of vehicle frame 400 is facilitated by actuated downward movement of upper frame retention fitting 332 as described below.

Second linear actuator 336 extends to translate upper frame retention fitting 332 downward and retracts to translate upper frame retention fitting 332 upward. When fully retracted, upper frame retention fitting 332 is well above below rear portion 404 of vehicle frame 400. Second linear actuator 336 extends upper frame retention fitting 332 downward towards rear portion 404 of vehicle frame 400 mounted to lower frame retention fitting 334. This movement facilitates cooperative engagement and retention of rear portion 404 of vehicle frame 400 between upper and lower frame retention fittings 332 and 334.

In various other embodiments, rear tooling assembly 300 is also provided with any additional means of vertically translating at least a portion of rear tooling assembly 300 without limitation. Non-limiting additional means of repositioning at least a portion of rear tooling assembly 300 include a support arm actuator operatively coupled between rear arm 318 and second axle end 324 that translates rear arm 318 in vertical direction 230 during lifting and lowering of frame 400 relative to frame transfer cart 500.

Rear arm 318 and attached rear tooling 326 freely rotate about axis of rotation 108 in cooperation with forward tooling 218 when frame 400 is mounted to vehicle assembly system 10. In cooperation with rotation of forward arm 210 and attached forward tooling 218, this rotation enables repositioning frame 400 within work station to facilitate performing multiple vehicle assembly steps involving different regions of frame 400 and/or using multiple tools or devices positioned at different locations within work station.

Referring again to FIG. 4, rear tooling assembly 300 also includes a locking means to lock position of rear arm 318 in at least one rotational position including, but not limited to, a generally vertical orientation (see FIG. 4), a horizontal orientation, or any other suitable rotational orientation. In one embodiment, locking means locks rear arm 318 in a generally vertical orientation to facilitate mounting and unmounting of frame 400. In other additional embodiments, locking means locks rear arm 318 at one or more additional orientations to position frame 400 for one or more production steps implemented within work station associated with vehicle assembly system 10.

Referring again to FIG. 4, the exemplary embodiment of rear tooling assembly 300 also includes a rear rotation locking pin actuator 340 coupled to rear support 302 and a rear rotation locking pin 342 operatively coupled to rear rotation locking pin actuator 340. Rear rotation locking pin actuator 340 advances and retracts rear rotation locking pin 342 in and out of a rear rotation locking pin receptacle 344 affixed to rear arm 318. When rear rotation locking pin 342 is advanced into rear rotation locking pin receptacle 344, rear arm 318 is locked into an orientation including, but not limited to, a generally vertical orientation as illustrated in FIG. 4. In various other embodiments, rear tooling assembly 300 includes multiple rear rotation locking pin receptacles 344 and/or multiple rear rotation locking pins 342 to lock rear arm 318 into multiple orientations.

In various embodiments, vehicle assembly system 10 includes additional elements 310 to move any one or more of a plurality of system elements in a forward-rear direction 312 including, but not limited to, forward fixed end 204 or rear fixed end 304 relative to support frame 102, forward tooling 218 relative to forward support 202, rear tooling 326 relative to rear support 302, and any other suitable system element without limitation. In various other embodiments, vehicle assembly system 10 includes one or more actuators that enable powered movements of any means of adjusting tooling separation distance 114 (see FIG. 2) including, but not limited to, means of translating any one or more of a plurality of system elements as described above.

In the exemplary embodiment illustrated in FIG. 2, rear tooling assembly also includes a linear slide bearing 310 that couples rear fixed end 304 of rear support 302 to support frame 102 in a forward-rear direction 312 along rear portion 112 of support frame 102. Linear slide bearing 310 repositions rear support 302 between at least two positions including, but not limited to, a first position 314 and a second position 316. First position 314 facilitates reducing tooling separation distance 114 and consequently facilitates mounting and coupling frame 400 to forward and rear toolings 218 and 326. Second position 316 increases tooling separation distance 114 and consequently positions frame 400 and frame transfer cart 500 between forward and rear toolings 218 and 326 prior to remounting frame 400 to frame transfer cart 500 after completion of at least one assembly task.

Referring again to FIG. 4, linear slide bearing 310 includes a stationary portion 354 coupled to support frame 102 and a carriage 356 coupled to rear fixed end 304 of rear support 302. Carriage 356 is also operatively coupled to stationary portion 354 in a sliding arrangement to move carriage 356 and attached rear support 302 in a direction aligned with axis of rotation 108. A locking pin receptacle 358 is coupled to carriage 356. Locking pin receptacle 358 receives a first rail locking pin 348 or a second rail locking pin 352 to lock carriage at first position 314 or a second position 316, respectively. First and second rail locking pins 348 and 352 are operatively coupled with first and second pin actuators 346 and 350, respectively. Each pin actuator 346 and 350 advances respective rail locking pins 348 and 352, into locking pin receptacle 358 to lock carriage 356 at first or second position 314 and 316, respectively, and also retracts respective rail locking pins 348 and 352, from locking pin receptacle 358 to unlock carriage 356 and consequently facilitate repositioning of carriage 356.

In various embodiments, the vehicle assembly system provided above may enable a method for performing at least two assembly tasks on a vehicle frame that includes mounting the vehicle frame to a vehicle assembly system, rotating the vehicle frame about an axis of rotation to a first position, performing a first assembly task on the vehicle frame, rotating the vehicle frame about the axis of rotation to a second position, and performing a second assembly task on the vehicle frame.

Figure 5A:
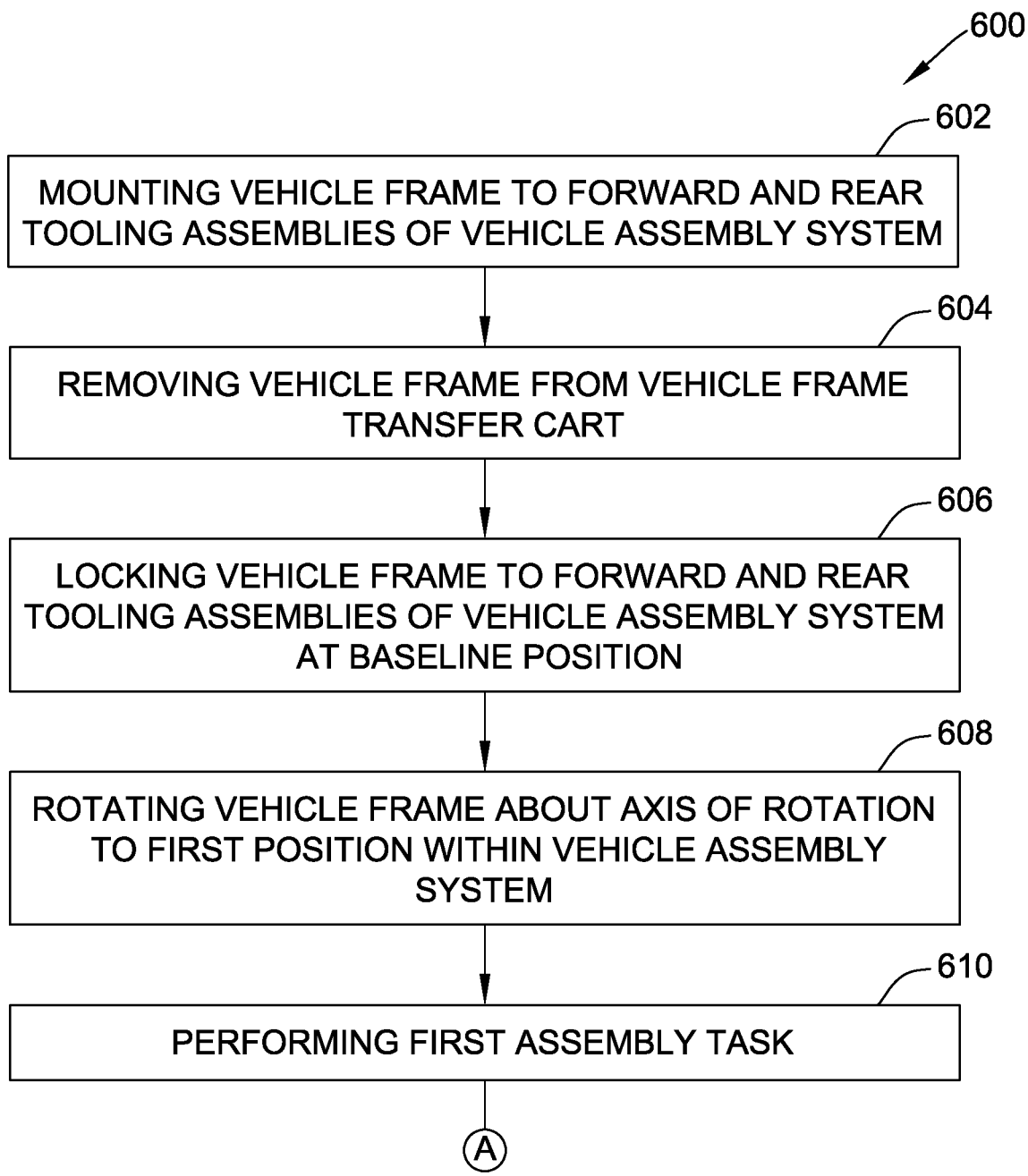
FIG. 5A is a block diagram of an exemplary method for performing at least two assembly tasks on a vehicle frame within a work station.
Figure 5B:
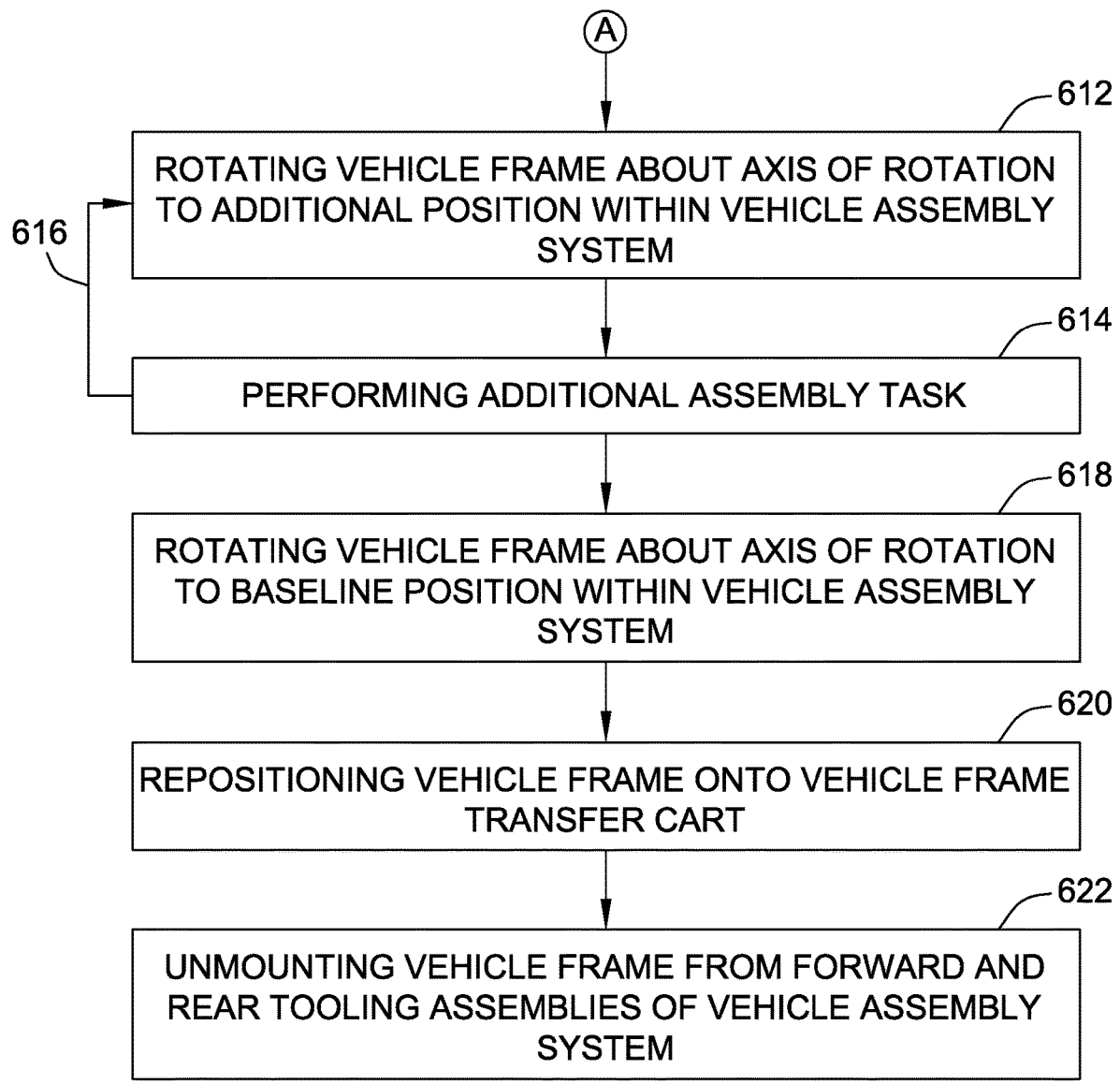
FIG. 5B is a block diagram of an exemplary method for performing at least two assembly tasks on a vehicle frame within a work station.

FIG. 5A and FIG. 5B are flow charts illustrating steps of an exemplary method 600 for performing at least two assembly tasks on a vehicle frame using the vehicle assembly system provided above. Method 600, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of method 600 may be able to be used as one or more algorithms to direct hardware to perform operations described herein.

In a typical production process, the vehicle frame is mounted on a vehicle frame transport cart and transported between different work stations of a production line during implementation of a production process that includes a plurality of production tasks performed at multiple work stations. Initially, the vehicle frame transport cart carrying the vehicle frame is positioned within the vehicle assembly system prior to mounting 602 such that forward and rear portions of the vehicle frame are aligned along the axis of rotation and below lower forward and lower rear frame retention fittings of the vehicle assembly system.

Referring again to FIG. 5A, method 600 includes mounting 602 the vehicle frame to the forward and rear tooling assemblies of the vehicle assembly system. Using the vehicle assembly system provided above, mounting 602 the vehicle frame includes repositioning the rear support from the second position to the first position to move the lower rear frame retention fitting below the rear portion of the vehicle frame. Mounting 602 the vehicle frame also includes translating the lower forward and lower rear frame retention fittings of the vehicle assembly system upward to engage the forward and rear portions of vehicle frame, respectively.

Method 600 also includes removing 604 the vehicle frame from the vehicle frame transfer cart and locking 606 the vehicle frame to the vehicle assembly system. Using the vehicle assembly provided described above, removing 604 the vehicle frame includes translating the lower forward and lower rear frame retention fittings upward in a coordinated manner to lift the forward and rear portions of the vehicle frame off of the vehicle frame transfer cart. Locking 606 the vehicle frame includes translating the lower forward and lower rear frame retention fittings upward in a coordinated manner, as well as translating the upper rear frame retention fitting downward to cooperatively engage and retain the vehicle frame as described above. Specifically, the forward portion of the vehicle frame is retained between the upper and lower forward frame retention fittings and the rear portion of the vehicle frame is retained between the upper and lower rear frame retention fittings to lock the vehicle frame at a baseline position characterized by a generally vertical orientation of the forward and rear arms of the forward and rear tooling assemblies, respectively, as illustrated in FIG. 2. Once the vehicle frame is locked to the forward and rear tooling assemblies, the vehicle frame transfer cart is removed from the vehicle assembly system to provide clearance for rotation of the vehicle frame about the axis of rotation, as illustrated in FIG. 1.

If the baseline position is a suitable orientation of the vehicle frame, an assembly task may be performed on the vehicle frame in the baseline position. Method 600 also includes rotating 608 the vehicle frame from the baseline position to a first position and performing 610 a first assembly task. Referring to FIG. 5B, method 600 further includes rotating 612 the vehicle frame to an additional position and performing 614 an additional assembly task. Optionally, method 600 includes repeating 616 rotating 612 of the vehicle frame to additional positions and performing 614 additional assembly tasks included among all assembly tasks to be performed within the work station. Using the vehicle assembly system provided above, rotating 608 and 612 the vehicle frame to the first position and each additional position, respectively, includes unlocking the forward and rear arms by retracting the forward and rear rotation locking pins, releasing the brake pads from the brake disc, rotating the vehicle frame about the axis of rotation to the desired position, and engaging the brake pads to the brake disc to hold the vehicle frame in place.

Upon completion of all assembly tasks of the work station, method 600 includes rotating 618 the vehicle frame to the baseline position within the vehicle assembly system. Using the vehicle assembly system provided above, rotating 618 to the baseline position includes releasing the brake pads from the brake disc, rotating the vehicle frame to the baseline position, locking the forward and rear arms by advancing the forward and rear rotation locking pins into the respective forward and rear rotation locking pin receptacles, and optionally applying the brake pads to the brake disc. Once the vehicle frame is locked in the baseline position, the vehicle frame transfer cart is repositioned below the vehicle frame.

Method 600 also includes repositioning 620 the vehicle frame onto the vehicle frame transfer cart and unmounting 622 the vehicle frame from the forward and rear tooling assemblies of the vehicle assembly system. Using the vehicle assembly system provided above, repositioning 620 the vehicle frame includes translating the upper rear frame retention fitting upward and translating the lower forward and rear frame retention fittings downward to release the forward and rear portions of the vehicle frame from cooperative mechanical engagement by the retention fittings, and additionally lowering the lower forward and rear frame retention fittings until the vehicle frame is supported on the vehicle frame transfer cart. Unmounting 622 the vehicle frame includes lowering the lower forward and rear frame retention fittings until separated from the forward and rear portions of the vehicle frame. Once separated, the vehicle frame and the vehicle frame transfer cart may be removed from the vehicle assembly system.

Exemplary embodiments of assembly tooling systems and more specifically, assembly toolings for rotating a vehicle frame to multiple rotational positions about an axis of rotation within a work station of a production line are described above in detail. Although the assembly tooling systems are herein described and illustrated in association with a vehicle frame, the invention is also intended for use in any work station of any assembly line for any product of manufacture without limitation. Moreover, it should also be noted that the components of the invention are not limited to the specific embodiments described herein, but rather, aspects of each component may be utilized independently and separately from other components and methods of assembly described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly for positioning a vehicle frame in a plurality of rotational positions about an axis of rotation, said assembly comprising :
   a forward tooling assembly comprising;
      a forward arm coupled to a forward support axle, said forward support axle aligned with and rotatable about the axis of rotation, and a forward tooling coupled to said forward arm, said forward tooling configured to engage and retain a forward portion of the vehicle frame; and
      a braking assembly operatively coupled to said forward arm, said braking assembly configured to apply a braking force to arrest rotation of said vehicle frame about the axis of rotation; and
   a rear tooling assembly comprising a rear arm coupled to a rear support axle, said rear support axle rotatable about the axis of rotation, and a rear tooling coupled to said rear arm, said rear tooling coupled to said rear arm, said rear tooling configured to engage and retain a rear portion of the vehicle frame, wherein said forward and rear tooling assemblies cooperatively rotate to position the vehicle frame in the plurality of rotational positions.

2. The assembly in accordance with claim 1, wherein said braking assembly comprises a pair of brake pads and a brake disc positioned therebetween, said pair of brake pads configured to engage said brake disc to apply a braking force to arrest rotation of said vehicle frame about the axis of rotation.

3. The assembly in accordance with claim 1, wherein said forward tooling comprises an upper forward frame support fitting and a lower forward linear actuator coupled to said forward arm, and a lower forward frame support fitting operatively coupled to said lower forward linear actuator, said lower forward linear actuator configured to extend lower forward frame support fitting toward upper forward frame support fitting, wherein said upper and lower forward frame support fittings are configured to cooperatively engage and retain the forward portion of the vehicle frame when said lower forward frame support fitting is fully extended toward said upper forward frame support fitting.

4. The assembly in accordance with claim 1, wherein the rear tooling comprises a lower rear linear actuator and an upper rear linear actuator coupled to said rear arm, a lower rear frame support fitting operatively coupled to said lower rear linear actuator, and an upper rear frame support fitting operatively coupled to said upper rear linear actuator, said lower rear linear actuator configured to extend lower rear frame support fitting toward upper forward frame support fitting, and said upper rear linear actuator configured to extend upper rear frame support fitting toward lower forward frame support fitting, wherein said upper and lower rear frame support fittings are configured to cooperatively engage and retain the rear portion of the vehicle frame when said lower rear frame support and said upper rear frame support are fully extended.

5. The assembly in accordance to claim 1, further comprising: a forward support extending from a fixed forward support end downward to a free forward support end, and a forward flange bearing coupled to said free forward support end, wherein said forward support axle is retained within said forward flange bearing; and a rear support extending downward from a fixed rear support end to a free rear support end, and a rear flange bearing coupled to said free rear support end, wherein said rear support axle is retained within said rear flange bearing.

6. The assembly in accordance to claim 5, further comprising a linear slide bearing comprising a stationary portion and a carriage operatively coupled to said stationary portion, said carriage coupled to fixed rear support end, wherein said carriage is configured to slide along said stationary portion in a direction parallel to the axis of rotation.

7. The assembly in accordance with claim 5, further comprising a forward locking pin operatively coupled to a forward pin actuator, and a forward locking pin receptacle, said forward pin actuator coupled to said forward support and said forward locking pin receptacle coupled to said forward arm, wherein said forward pin actuator is configured to advance said forward locking pin into said forward locking pin receptacle to lock said forward arm at a fixed rotation.

8. The assembly in accordance with claim 5, further comprising a rear locking pin operatively coupled to a rear pin actuator, and a rear locking pin receptacle, said rear pin actuator coupled to said rear support and said rear locking pin receptacle coupled to said rear arm, wherein said rear pin actuator is configured to advance said rear locking pin into said rear locking pin receptacle to lock said rear arm at a fixed rotation.

9. The assembly in accordance with claim 1, wherein said braking assembly comprises a drum break, said drum break configured to apply a braking force to arrest rotation of said vehicle frame about the axis of rotation.

10. A system for positioning a vehicle frame in a plurality of rotational positions about an axis of rotation, said system comprising: a tooling assembly, said tooling assembly comprising a forward tooling assembly and a rear tooling assembly configured to engage and retain the vehicle frame; a forward support extending downward from a fixed forward support end to a free forward support end, a forward flange bearing coupled to said free forward support end, and a forward support axle retained within said forward flange bearing, said forward tooling assembly coupled to said forward support axle; and a rear support extending downward from a fixed rear support end to a free rear support end, a rear flange bearing coupled to said free rear support end, and a rear support axle retained within said rear flange bearing, said rear tooling assembly coupled to said rear support axle; wherein said forward and rear tooling assemblies cooperatively rotate to position the vehicle frame in the plurality of rotational positions.

11. The system in accordance with claim 10, wherein: said forward tooling assembly comprises a forward arm coupled to said forward support axle, said forward support axle aligned with and rotatable about the axis of rotation, and a forward tooling coupled to said forward arm, said forward tooling configured to engage and retain a forward portion of the vehicle frame; and said rear tooling assembly comprises a rear arm coupled to said rear support axle, said rear support axle aligned with and rotatable about the axis of rotation, and a rear tooling coupled to said rear arm, said rear tooling configured to engage and retain a rear portion of the vehicle frame.

12. The system in accordance with claim 11, wherein said forward tooling assembly further comprises a braking assembly operatively coupled to said forward arm, said braking assembly comprising a pair of brake pads and a brake disc positioned therebetween, said pair of brake pads configured to engage said brake disc to apply a braking force to arrest rotation of said vehicle frame about the axis of rotation.

13. The system in accordance with claim 11, wherein the forward tooling comprises an upper forward frame support fitting and a lower forward linear actuator coupled to said forward arm, and a lower forward frame support fitting operatively coupled to said lower forward linear actuator, said lower forward linear actuator configured to extend lower forward frame support fitting toward upper forward frame support fitting, wherein said upper and lower forward frame support fittings are configured to cooperatively engage and retain the forward portion of the vehicle frame when said lower forward frame support fitting is fully extended toward said upper forward frame support fitting.

14. The system in accordance with claim 11, wherein the rear tooling comprises a lower rear linear actuator and an upper rear linear actuator coupled to said rear arm, a lower rear frame support fitting operatively coupled to said lower rear linear actuator, and an upper rear frame support fitting operatively coupled to said upper rear linear actuator, said lower rear linear actuator configured to extend lower rear frame support fitting toward upper forward frame support fitting, and said upper rear linear actuator configured to extend upper rear frame support fitting toward lower forward frame support fitting, wherein said upper and lower rear frame support fittings are configured to cooperatively engage and retain the rear portion of the vehicle frame when said lower rear frame support and said upper rear frame support are fully extended.

15. The system in accordance with claim 11, further comprising a forward locking pin operatively coupled to a forward pin actuator, and a forward locking pin receptacle, said forward pin actuator coupled to said forward support and said forward locking pin receptacle coupled to said forward arm, wherein said forward pin actuator is configured to advance said forward locking pin into said forward locking pin receptacle to lock said forward arm at a fixed rotation.

16. The system in accordance with claim 11, further comprising a rear locking pin operatively coupled to a rear pin actuator, and a rear locking pin receptacle, said rear pin actuator coupled to said rear support and said rear locking pin receptacle coupled to said rear arm, wherein said rear pin actuator is configured to advance said rear locking pin into said rear locking pin receptacle to lock said rear arm at a fixed rotation.

17. The system in accordance to claim 10, further comprising a linear slide bearing comprising a stationary portion and a carriage operatively coupled to said stationary portion, said carriage coupled to fixed rear support end, wherein said carriage is configured to slide along said stationary portion in a direction parallel to the axis of rotation.

18. The system in accordance with claim 17, further comprising a support frame positioned over a work station, wherein said fixed forward support end is coupled to said support frame and said stationary portion of said linear slide bearing is coupled to said support frame.

19. A method for performing at least two assembly tasks on a vehicle frame positioned within a work station, the method comprising:
providing an assembly comprising a forward tooling comprising a forward arm coupled to a forward support axle, and a forward tooling coupled to the forward arm, the forward tooling configured to engage and retain a forward portion of the vehicle frame and a rear tooling comprising a rear arm coupled to a rear support axle and a rear tooling coupled to the rear arm, the rear tooling coupled to the rear arm, the rear tooling configured to engage and retain a rear portion of the vehicle frame, wherein the forward and rear toolings cooperatively rotate to position the vehicle frame in a plurality of rotational positions about an axis of rotation;

locking the vehicle frame to the forward and rear toolings;

rotating the vehicle frame about the axis of rotation to a first rotational position within the work station;

performing a first assembly task to the vehicle frame;

rotating the vehicle frame about the axis of rotation to an additional rotational position within the work station;

applying a braking force to arrest rotation of the vehicle frame about the axis of rotation using a braking assembly coupled to the forward arm, the braking assembly comprising a pair of brake pads and a brake disc positioned therebetween, the pair of brake pads configured to engage the brake disc to apply the braking force to arrest rotation of the vehicle frame about the axis of rotation; and performing an additional assembly task to the vehicle frame.

20. The method in accordance with claim 19, further comprising, for a plurality of additional assembly tasks performed at a corresponding plurality of additional positions within the work station: rotating the vehicle frame about the axis of rotation to each corresponding additional rotational position of the corresponding plurality of additional positions within the work station; and performing each additional assembly task of the plurality of additional assembly tasks.

* * * * *